Dec. 26, 1967 T. J. McKEY 3,359,683

LATCH RELEASE

Filed Jan. 24, 1966

INVENTOR.
THOMAS J. McKEY
BY Carl J. Barbee
ATTORNEY

United States Patent Office 3,359,683
Patented Dec. 26, 1967

3,359,683
LATCH RELEASE
Thomas J. McKey, Grosse Pointe, Mich., assignor to American Motors Corporation, Kenosha, Wis., a corporation of Maryland
Filed Jan. 24, 1966, Ser. No. 522,602
5 Claims. (Cl. 49—72)

ABSTRACT OF THE DISCLOSURE

The invention relates to a specific type of structure for blocking the opening of the tailgate of a station wagon type of automobile whenever the window of such tailgate is not fully lowered. The specific structure includes a spring pressed elongated rod which has an outwardly bent leg which the window engages as it approaches fully lowered position.

---

The invention relates to a latch release for controlling the opening and closing of a door having a retractible window pane associated therewith.

The invention is shown as it may be employed with the rear door of a station wagon type of automotive vehicle wherein a retractible window pane, when lowered fully, effects the release of the latch operating lever so as to permit opening the door. When the door and window are closed, the top and side edges of the window are received in the channels of the vehicle body which define the opening above the door.

The principal object is to provide means for preventing opening of the door unless the window pane is fully retracted into the interior of the door.

A specific object is to provide a spring pressed blocker rod within the interior of the door which rod prevents actuation of the lever which controls the opening of the door.

Other objects and advantages of the invention will be apparent from the ensuing specification and appended drawing in which.

Figure 1:
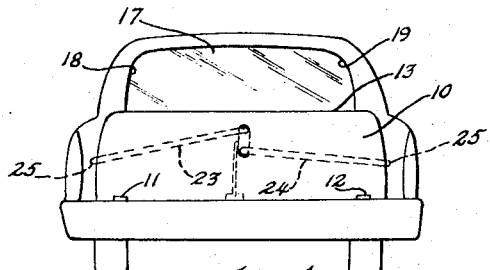
FIGURE 1 is a rear view of a station wagon type automotive vehicle in which the window pane is closed.
Figure 2:
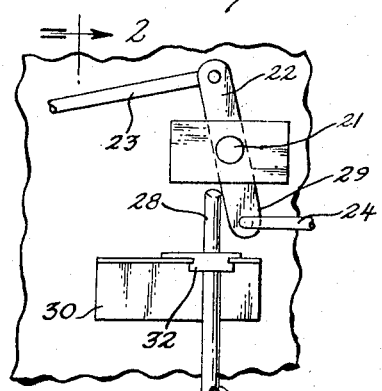
FIGURE 2 is a sectional view taken on the line 2—2 of FIGURE 3.
Figure 3:
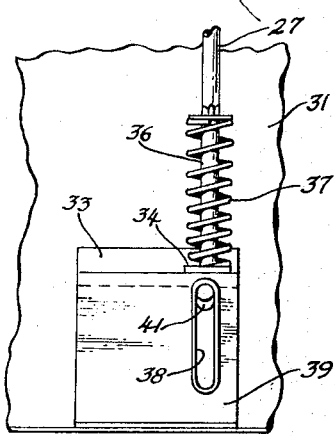
FIGURE 3 is a fragmentary view showing a portion of the inner door panel and the blocker mechanism mounted thereon.

In FIGURE 1 I have shown the rear end of a station wagon type automotive vehicle in which a door 10 is mounted on suitable hinges 11 and 12 so that the door can be opened by swinging it down toward a horizontal position. The upper edge 13 of the door defines the lower edge of the window opening. The top and side edges 14, 15 and 16 respectively of the automobile body define the remaining edges of the window opening and each such edge is provided with conventional channel construction for receiving the top and side edges 17, 18 and 19 respectively of the window pane. Thus, if the window is lowered to a position as shown in FIGURE 2, the side edges of the window pane would still be partially received in the body channels and upon opening the door the window would break. However, because of the blocker mechanism, the door cannot be opened until the window is fully lowered to the dotted line position as shown in FIGURE 2.

I have not shown the mechanism for raising and lowering the window and it will be understood a conventional one would be employed. The opening of the door is effected by turning the latch shaft 21 to which lever 22 is attached. The lever has control rods 23 and 24 connected at its opposite ends so that by turning latch shaft 21 both control rods are simultaneously actuated. The automobile body is provided with appropriate keepers 25 into which the latching mechanisms (not shown) at the ends of the control rods are received for latching the door in closed position.

The blocking mechanism, which prevents opening of the door until the window is fully lowered, includes a rod 27, the upper end 28 of which projects into the path of movement of the lower end 29 of lever 22 and remains there until the window is fully lowered. A bracket 30 is secured to the interior face 31 of the inner door panel and a bearing in the form of an insert 32 of synthetic resin material slidably receives the upper end of the rod 27. Bracket 33 is secured to the interior surface of the inner door panel and has an insert 34 in wall 35 which serves as a bearing for the lower end 36 of rod 27. A spring 37 continuously urges the rod upwardly into lever blocking position until the window is fully lowered, at which time the upper end of the rod will be moved downwardly sufficiently far as to no longer block the lever 22. The extent of up and down movement of rod 27 is determined by the elongated slot 38 in the front wall 39 of bracket 33. The lower end of the rod is bent at 40 and the laterally projecting leg 41 protrudes through the slot 38. The frame member 42 secured to the lower edge of the window engages the leg and when the window is fully lowered, the spring becomes increasingly energized. When the window is again raised, the spring causes rod 27 to move upwardly to blocking position and the leg 41 engages the upper end of slot 38. The upper end of the spring engages a washer 44 which engages the projections 45 formed on the rod by staking. The lower end of the spring engages the insert 34 and is energized to some extent at all times for maintaining blocking condition at all times.

Figure 5:
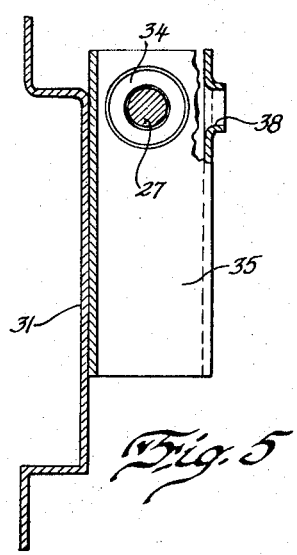
FIGURE 5 is a fragmentary detail view taken on the line 5—5 of FIGURE 2.
Figure 4:
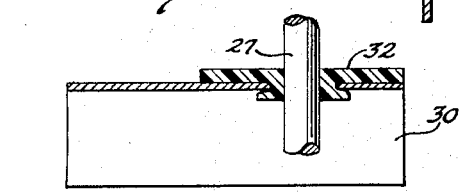
FIGURE 4 is a fragmentary detail view taken on the line 4—4 of FIGURE 2.

In FIGURE 5 the leg 41 is omitted and the bracket 33 is broken in section so as to better show the flange 46 surrounding slot 38.

I claim:
1. For use with a vehicle body having a rear wall with a door opening therein and a door for closing off the opening, said door having inner and outer panels spaced from each other to provide a chamber therebetween and a window retractible into the chamber, apparatus for controlling the opening and closing of the door relative to the vehicle body, comprising.
(a) a latch operating lever rotatively carried on the inner door panel;
(b) control rods connected to the latch operating lever;
(c) keepers in the vehicle body for engagement by the control rods to maintain the door in closed position relative to the vehicle body;
(d) a blocking mechanism for preventing movement of the latch operating lever in door opening direction, said mechanism including:
(1) upper and lower brackets secured to the inner door panel; said brackets having openings therein which are in substantial registry with each other;
(2) a blocker rod passing through said openings so as to be reciprocally carried by the brackets;
(3) said lower bracket having an elongated slot therein and the blocker rod having an outwardly turned leg passing through the elongated slot;
(4) spring means normally urging the blocker rod into a position of blocking the latch operating lever;

(5) the window having contact with the blocker rod leg for moving the rod to a position to release the latch operating lever, thereby permitting the door to be opened.

2. Apparatus as set forth in claim 1 wherein the spring means has its lower end engaging the lower bracket and its upper end secure with reference to the blocker rod.

3. For use with a vehicle door having inner and outer panels and a window retractible into the door between the panels; a lever rotatively mounted on the inner panel for controlling opening and closing of the door; a blocking mechanism for immobilizing the lever until the window is fully retracted into the door and including upper and lower brackets mounted on the inner panel; a blocker rod reciprocably carried by the brackets; one of the brackets having an elongated slot therein; a leg on the blocker rod projecting laterally therefrom through the slot, the lower edge of the window engaging the leg for lowering the blocker rod until its upper end is clear of the lever, thereby permitting rotation of the lever to effect opening of the door; spring means on the lower bracket and engaging the blocker rod to urge the rod in a direction to block the lever.

4. For use with a vehicle door having inner and outer panels and a window retractable into the door between the panels; a lever rotatably mounted on the inner panel for controlling opening and closing of the door; a blocking mechanism for immobilizing the lever until the window is fully retracted into the door and including upper and lower brackets mounted on the inner panel; said brackets having openings therein which are in substantial registry with each other; a blocker rod passing through said openings so as to be reciprocally carried by the brackets; the lower bracket having an elongated slot therein; a leg on the blocker rod projecting laterally therefrom through the slot, the lower edge of the window engaging the leg for lowering the blocker rod until its upper end is clear of the lever, thereby permitting rotation of the lever to effect opening of the door; spring means on the lower bracket and engaging the blocker rod to urge the rod in a direction to block the lever.

5. Apparatus as set forth in claim 4 wherein the lower bracket has an upper wall with the opening therein and a front wall substantially at right angles to the upper wall said front wall having the elongated slot therein.

References Cited

UNITED STATES PATENTS 2,959,448  11/1960  Bogater et al. _____ 49—72 X

FOREIGN PATENTS 514  2/1868  Great Britain.

DAVID J. WILLIAMOWSKY, *Primary Examiner.*

J. K. BELL, *Assistant Examiner.*